United States Patent [19]
Hall

[11] 3,902,612
[45] Sept. 2, 1975

[54] REEL TRANSPORT STORAGE MECHANISM
[76] Inventor: Fred C. Hall, 820 Sharon Park Dr., Menlo Park, Calif. 94025
[22] Filed: Aug. 16, 1973
[21] Appl. No.: 388,951

[52] U.S. Cl. ............ 214/77 R; 214/85; 214/DIG. 4; 214/505; 296/4
[51] Int. Cl. ............................................. B60p 1/48
[58] Field of Search ............ 214/77 R, 85, 518, 502, 214/501, 504, DIG. 4, 505, 130 C, 75 R, DIG. 1, 16.4 A, DIG. 3, 16.4 R; 211/23, 24; 296/3, 4; 193/38, 41; 104/164

[56] References Cited
UNITED STATES PATENTS

| | | | |
|---|---|---|---|
| 2,099,998 | 11/1937 | Berg | 214/77 R |
| 2,562,035 | 7/1951 | Hileman | 214/130 C |
| 2,848,123 | 8/1958 | Keys | 214/77 R |
| 3,625,380 | 12/1971 | Anderson | 214/77 R |

FOREIGN PATENTS OR APPLICATIONS

| | | | |
|---|---|---|---|
| 747,605 | 4/1956 | United Kingdom | 214/16.4 A |

Primary Examiner—Robert J. Spar
Assistant Examiner—Gary Auton

[57] ABSTRACT

There is disclosed a reel transport storage mechanism which comprises reel lifting means mounted on a truck to facilitate transport and winding or unwinding cable therefrom, which means is also arranged to position a reel on a frame fixed to the truck and including plane forming members which enable the reel to be rolled therealong to a storage position, the members facilitating re-positioning of the reel for reeling or unreeling operation when required, the members being adjustable in a manner to change the slope for the purposes hereof.

4 Claims, 5 Drawing Figures

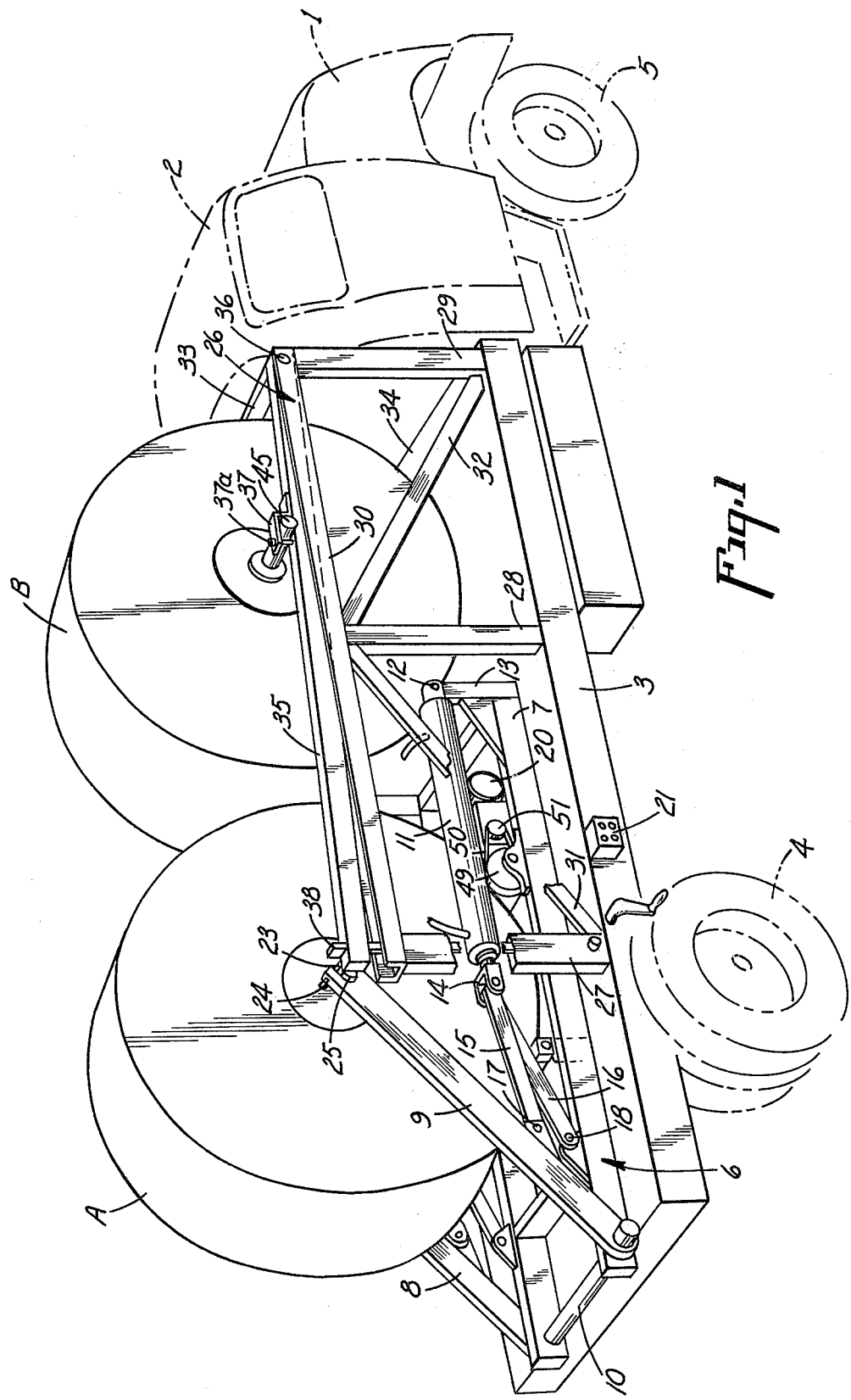

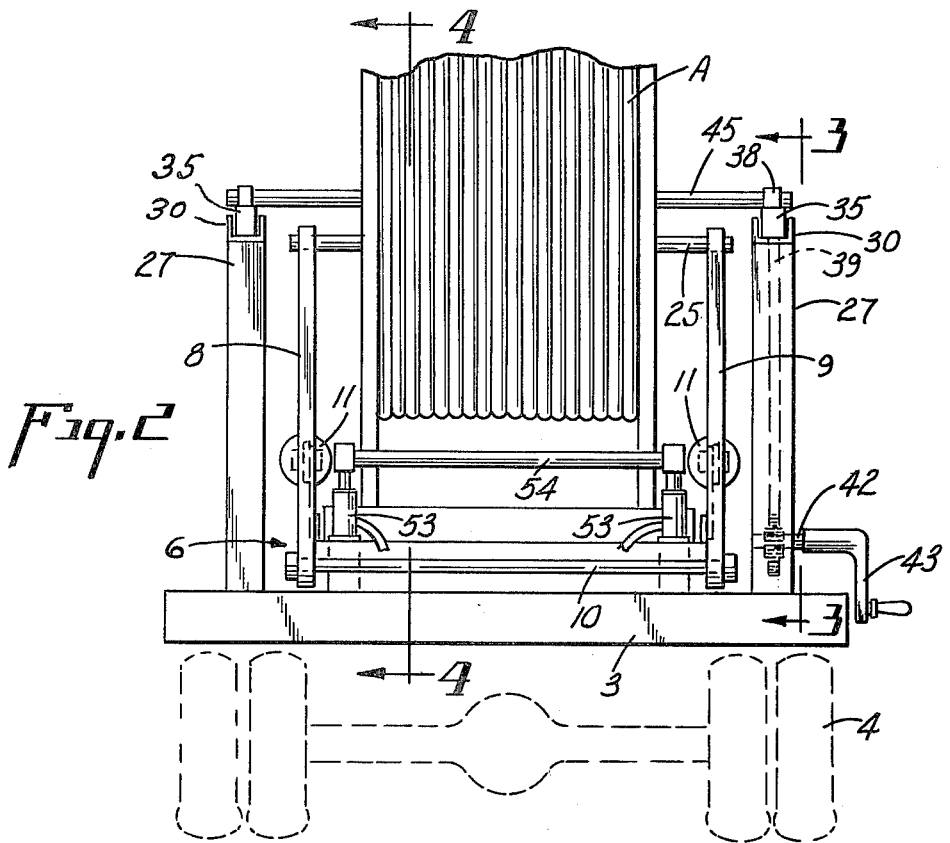
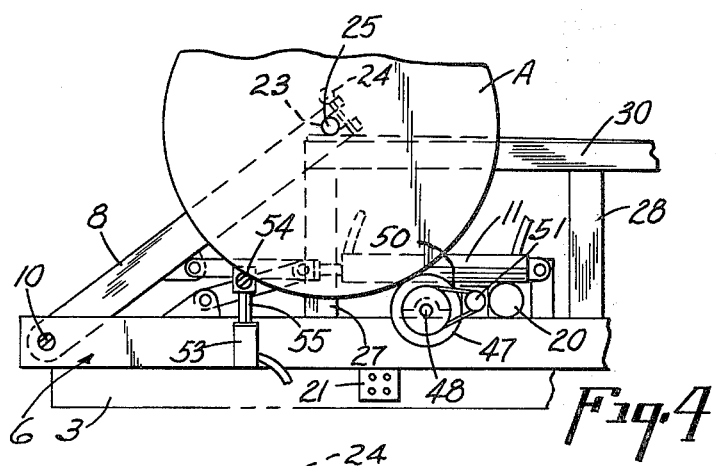
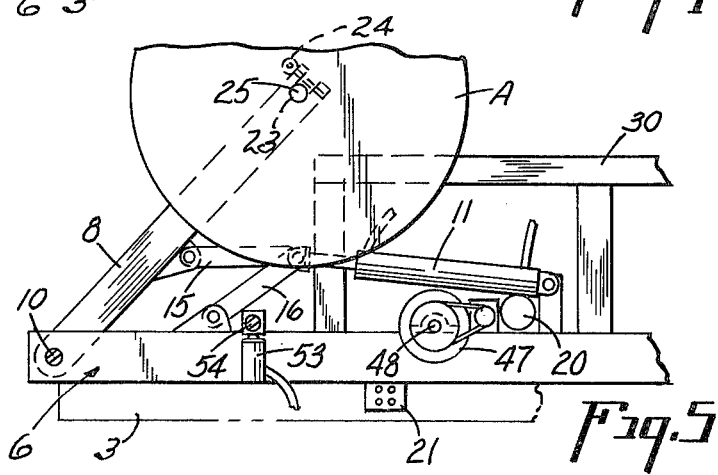
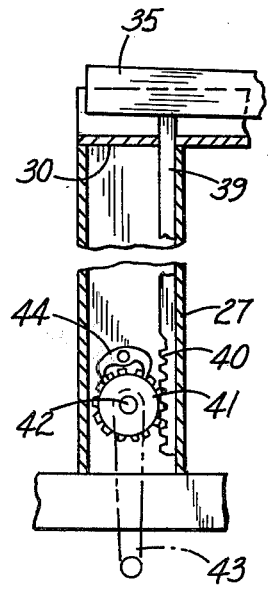

REEL TRANSPORT STORAGE MECHANISM

OBJECTS OF THE INVENTION

It is a principal object of this invention to provide for the safe transport of reels for utility purposes or similar reasons, which transport is effected by raising the reel from the ground or other location into position on the truck, rolling the reel forward to a storage position and retaining the same there, the means for effecting the rolling being virtually automatic since it is dependent upon the incline thereof.

It is a further object of this invention to facilitate retrieving the reel from storage position by adjusting the support for the reel so that the reel will more rearwardly into a position to be operated for reeling or unreeling the cable or other means therefrom.

A specific object of the invention is to provide rail transport storage means involving planar members or plane forming members which are supported above a truck, so that placing a reel with the support rod extending therefrom on such plane forming members will enable the same to be rolled forwardly by adjustment of the members into the forwardly inclined position, or rearwardly by adjustment of the members into a rearwardly inclined position without relying upon pure human force which would result in damage or injury to limbs or other parts of the body.

A more specific object of the invention is to facilitate the raising and lowering of the plane forming members by simple means so that the same may be retained in either position and in conjunction with reel lifting means facilitate the positioning of the reels in storage or for the unreeling or reeling positions.

Other and further objects of the invention will be understood from a consideration of the specification appended hereto and disclosed in the drawings, wherein:

FIG. 1 is a perspective view showing the transport storage mechanism of this invention in position with reels carried thereby, one of the reels being in the forward position, and the other in the operative reeling and unreeling position.

FIG. 2 is a rear view of the disclosure of FIG. 1, indicating the relationship of various parts of the invention.

FIG. 3 is a fragmentary sectional view showing the means for changing the position of the plane forming members hereof.

FIG. 4 is a fragmentary, somewhat diagrammatic view to illustrate the operation of certain of the parts hereof for handling the reel into position for driving the same or subsequent moving of the same into storage position.

FIG. 5 is similar to FIG. 4, and with the reel lifting means in other position.

DESCRIPTION OF THE INVENTION

Referring now to FIG. 1, the invention hereof is shown as being mounted on a vehicle such as a truck, generally denoted 1, of the usual form, having a cab 2 thereon.

A truck bed such as 3 is provided, extending from the cab aft toward and over the rear wheels 4, the front wheels 5 being provided in the usual contemplation of truck mounted equipment.

Reel lifting means, generally denoted at 6, preferably comprise a frame 7 generally rectangular outline in plan, with lift arms 8 and 9 pivotally supported on the transverse axle 10 so that the same may be moved from the position shown in FIG. 1 around the axle 10.

In order to effect such movement, reel lifting piston and cylinder means, including a pair of means one of which is shown in FIG. 1 at 11, pivotally connected at 12 to upstanding frame elements 13, at the piston rod end a yoke 14 is provided for each piston and cylinder member unit 11, connected to an upper link 15 and a lower link 16, the former being pivotally connected at 17 to the lifting arm 9 and the latter or lower link connected pivotally at 18 to the frame 7 previously mentioned.

It will be apparent that this arrangement is duplicated at the opposite side for the lift arm 8 and by appropriate manipulation of the hydraulic piston and cylinder units 11 as supplied from a pump 20, by control means not illustrated in detail but suggested at 21, the lift arms 8 and 9 may be moved to carry a reel such as A from the position shown in FIG. 1 to a position where the same is supported on the ground, for example.

The extremities of the arms 8 and 9 are provided as suggested with open ended slots 23, which by means of suitable pins such as 24 may receive therewithin the axle 25 upon which the reel A is supported for lifting operation.

The storage mechanism hereof is now particularly described as including a support generally designated 26 which support comprises an upwardly open frame with vertical members 27, 28 and 29 connected to the truck bed, 3 or body 3, and extending upwardly being in turn fastened in any suitable manner to a channel part 30, suitable brace members such as 31 and 32 being provided to rigidify the frame portion now being described.

Extending transversely of the body are other frame parts 33 at the upper ends of the parts 29 and 34 at the lower ends, which connect at their opposite ends from that shown in FIG. 1 with an identical frame unit such as has just now been described, including the vertical members 27, 28 and 29 and the channel member 30 with braces such as 31 and 32.

There is thus provided an upwardly open, generally U-shaped support, the channels 30 in each case having mounted as shown a plane forming member 35 which is in actuality a beam and thus a pair of beams 35, pivotally engaged with the channel member 30 in each case at 36 at the forward ends thereof.

This pair of beams 35 includes a stop 37 mounted thereon near the forward end, with a stop such as 38 being provided at the rear.

Since it is desired to raise and lower these beams 35 around the pivot 36 into the channels 30 in each case and upwardly therefrom at their rearward extremities, suitable mechanism in the form of means to raise and lower the ends of the plane forming members is provided in the rear supports 27 as shown in greater detail in FIG. 3.

As suggested, the support 27 in each case is a hollow member, generally rectangular tubular form, and includes a vertically movable element 39 which includes a rack portion 40 at the lower end thereof, engageable with a pinion 41 suitably mounted on a transverse axle 42 at one end of which is provided a crank 43 for rotating the pinion 41, there being a locking dog 44 provided to maintain the rack and pinion in position upon manipulation thereof.

The vertically movable element 39 extends up through the bottom of the channel 30 in each case the rear end of each channel 30 as shown in FIG. 4 being lower than the forward end, to facilitate rearward rolling as indicated by the dotted lines, and is adapted to engage with the free end of each of the beams 35 so that by manipulation of the crank 43, the beams 35 may be raised or lowered at their rearward ends as indicated in FIG. 1, for example.

As suggested in FIG. 1, a reel such as B is shown as being supported on a long axle 45 which extends through the axis of the reel B and is adapted to roll along the beams 35.

As noted in FIG. 1, the beams 35 are inclined forwardly, and thus the reel B will roll along the upper surfaces of the beams 35 toward the front of the vehicle, and specifically of course the support frame into the position as shown, and lock therein by a pin 37a suitably placed in openings provided therefor, there being preferably one of these at each side, and in each beam.

Since the reels to be transported and manipulated by the mechanism hereof are desirably to be driven in a rotative manner, suitable means for this purpose are shown, as including a transversly extending cylindrical drive roll 47 suitably mounted on an axle 48, with sprocket means connected to said axle as suggested at 49, driven by a chain 50 trained over a smaller sprocket 51, which in turn is driven by the hydraulic motor 20, previously described.

Turning now to FIG. 1, the driving of the reel A is shown in greater detail, having been moved into the position by the lift arms 8 and 9 so that the periphery of the reel A is engaged with the drive roll 47, whereby the reel is driven in either preferred direction for whatever purposes may be desired at that time.

When it is desired to move the reel A into the position of the reel B, it is necessary to support the reel A for a period of time until the axle 25 thereof can be replaced by a long axle 45, for example, in order to extend outwardly far enough for said axle 45 to engage the beams 35.

Thus, the means shown in FIG. 4 for supporting the reel A is provided, comprising a pair of piston and cylinder units 53, one at each side of the lift frame 7, with a transverse support rod 54 extending between the upper ends of the piston rods 55.

By simultaneously moving the piston rods 55 of the piston and cylinder units 53, the transverse rod 54 is moved upwardly, engages the periphery of the reel A, and in conjunction with the drive cylinder 47 supports the entire weight of the reel A.

Thereupon the axle 25 may be withdrawn, and an axle such as 45 substituted therefor. Thereafter, the beams 35 may be raised to take the entire weight of the reel off the transverse rod 54 and drive cylinder 47, raising the reel high enough so it will pass over the drive cylinder 47 and be gravity move forwardly into the position of the reel shown in FIG. 1 and denoted B.

By opposite manipulation from that just heretofore described, it will be apparent that the reel in the position of the reel B may be again moved rearwardly by lowering the beams 35 by means of the raising and lowering means in the rear supports 27, so that the reel may roll rearwardly by gravity against the stops 38 and thereafter be engaged again with the slots 23 in the extremities of the lift arms 8 and 9.

At this point, the piston and cylinder units 53 are actuated to raise the reel as suggested in FIG. 4, to substitute the axle 25 for the axle 45 whereafter the driving of the reel A in FIG. 4 may be effected, or the reel moved to the ground without changing axles as will be apparent. facilitating

I claim:

1. In reel transport storage mechanism of the class described, in combination, a vehicle, vertically movable reel lifting and loading means connected to the rear end of said vehicle, and storage mechanism mounted on said vehicle, said mechanism including a support and adjustable plane forming members by which a reel support axle is carried on said support, said members facilitating fore and aft rolling movement of such reel, the support comprising an upwardly open frame, the plane forming members are elongated parts extending along the frame at the upper portion thereof, means are provided to raise and lower the corresponding ends of the members for rolling the reel therealong, the members being positioned at opposite sides of the frame, pivoted at their forward ends, and means to raise and lower the corresponding ends are located at longitudinally spaced positions from the pivots aforesaid for simultaneous actuation, whereby said reel lifting and loading means can engage a reel on the ground to the rear of the vehicle, transferring the reel to the vehicle where it is supported by the support, and by raising the rear end of said members, said reel will roll forwardly where it may be stored during transport.

2. The combination as claimed in claim 1, wherein the elongated parts comprising the frame consist of a pair of beams, each beam pivoted at its forward end to a support member and at its rear end arranged for engagement by a simultaneously vertically movable element, comprising the means to raise and lower the corresponding ends of the members.

3. The combination as claimed in claim 2, wherein the elements consist of racks and pinions engaged therewith, connected to a shaft operated by a crank, releasable locking instrumentalities being engageable with said pinions.

4. The combination as claimed in claim 1, wherein the plane forming members are spaced outside of the lifting means, said lifting means being arranged to position a reel or the like on said members.

* * * * *